(12) United States Patent  (10) Patent No.: US 9,047,019 B2
Florendo  (45) Date of Patent: Jun. 2, 2015

(54) SHARED TEMPORARY STORAGE MANAGEMENT IN A SHARED DISK DATABASE CLUSTER

(75) Inventor: Colin Joseph Florendo, Marlborough, MA (US)

(73) Assignee: SYBASE, INC., Dublin, CA (US)

( * ) Notice: Subject to any disclaimer, the term of this patent is extended or adjusted under 35 U.S.C. 154(b) by 102 days.

(21) Appl. No.: 13/291,157

(22) Filed: Nov. 8, 2011

(65) Prior Publication Data

US 2013/0117526 A1   May 9, 2013

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0622* (2013.01); *G06F 3/0637* (2013.01); *G06F 3/064* (2013.01); *G06F 3/067* (2013.01)

(58) Field of Classification Search
CPC .............................. G06F 3/0622; G06F 3/0637
USPC .......................................................... 711/171
See application file for complete search history.

(56) References Cited

U.S. PATENT DOCUMENTS

| | | | | |
|---|---|---|---|---|
| 5,193,171 | A * | 3/1993 | Shinmura et al. | 711/113 |
| 5,347,514 | A * | 9/1994 | Davis et al. | 370/429 |
| 5,371,882 | A * | 12/1994 | Ludlam | 714/6.32 |
| 7,272,613 | B2 * | 9/2007 | Sim et al. | 709/223 |
| 7,356,655 | B2 * | 4/2008 | Allen et al. | 711/153 |
| 7,464,232 | B2 * | 12/2008 | Shibayama et al. | 711/161 |
| 7,574,560 | B2 * | 8/2009 | MacHardy et al. | 711/114 |
| 7,644,244 | B2 * | 1/2010 | Homma et al. | 711/162 |
| 7,702,873 | B2 * | 4/2010 | Griess et al. | 711/170 |
| 7,743,222 | B2 * | 6/2010 | Allen et al. | 711/153 |
| 7,752,402 | B2 * | 7/2010 | Fachan et al. | 711/161 |
| 7,844,945 | B2 * | 11/2010 | Bhagia et al. | 717/107 |
| 8,024,383 | B2 * | 9/2011 | Patel et al. | 707/821 |
| 8,271,718 | B2 * | 9/2012 | Nakajima et al. | 711/103 |
| 2002/0133491 | A1 * | 9/2002 | Sim et al. | 707/10 |
| 2004/0230762 | A1 * | 11/2004 | Allen et al. | 711/170 |

(Continued)

FOREIGN PATENT DOCUMENTS

WO   WO2010/103569      *  9/2010   ............... G06F 3/06
WO   WO2010103569  A1 *  9/2010   ............... G06F 3/06

OTHER PUBLICATIONS

ASE Cluster Edition: Technical Overview White Paper, Sybase, Oct. 26, 2009, retrieved from https://web.archive.org/web/20091026072157/http://www.sybase.com/files/White_Papers/Sybase_ASE_Cluster_TechWP.pdf on Dec. 16, 2014 (28 pages).*

(Continued)

*Primary Examiner* — Yong Choe
*Assistant Examiner* — Daniel C Chappell
(74) *Attorney, Agent, or Firm* — Sterne, Kessler, Goldstein & Fox P.L.L.C.

(57) ABSTRACT

System, method, computer program product embodiments and combinations and sub-combinations thereof for temporary storage management in a shared disk database cluster are provided. Included is the reserving of units on-demand and of variable size from shared temporary storage space in the SDC. The utilization of the reserved units of the shared temporary storage space is tracked, and the shared temporary storage space is administered based on the tracking.

18 Claims, 7 Drawing Sheets

(56) References Cited

U.S. PATENT DOCUMENTS

| | | | |
|---|---|---|---|
| 2007/0073988 A1* | 3/2007 | Shibayama et al. | 711/165 |
| 2007/0150677 A1* | 6/2007 | Homma et al. | 711/162 |
| 2007/0156957 A1* | 7/2007 | MacHardy et al. | 711/114 |
| 2008/0046667 A1* | 2/2008 | Fachan et al. | 711/154 |
| 2008/0177741 A1* | 7/2008 | Joshi et al. | 707/8 |
| 2008/0313641 A1* | 12/2008 | Inoue et al. | 718/104 |
| 2009/0077331 A1* | 3/2009 | Shibayama et al. | 711/161 |
| 2010/0049776 A1* | 2/2010 | Patel et al. | 707/818 |

OTHER PUBLICATIONS

Sybase IQ Quick Start, Apr. 2009, retrieved from http://infocenter.sybase.com/help/topic/com.sybase.infocenter.dc01014.1500/pdf/qsiq.pdf on Dec. 24, 2014 (30 pages).*

* cited by examiner

SHARED TEMPORARY STORAGE MANAGEMENT IN A SHARED DISK DATABASE CLUSTER

BACKGROUND

1. Field of the Invention

The present invention relates to information processing environments and, more particularly, to shared temporary storage management in a shared disk database cluster.

2. Background Art

Computers are very powerful tools for storing and providing access to vast amounts of information. Computer databases are a common mechanism for storing information on computer systems while providing easy data access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level.

In recent years, users have demanded that database systems be continuously available, with no downtime, as they are frequently running applications that are critical to business operations. In response, distributed database systems have been introduced. Architectures for building multi-processor, high performance transactional database systems include a Shared Disk Cluster (SDC), in which multiple computer systems, each with a private memory share a common collection of disks. Each computer system in a SDC is also referred to as a node, and all nodes in the cluster communicate with each other, typically through private interconnects.

In general, SDC database systems provide for transparent, continuous availability of the applications running on the cluster with support for failover amongst servers. More and more, mission-critical systems, which store information on database systems, such as data warehousing systems, are run from such clusters. Products exist for building, managing, and using a data warehouse, such as Sybase IQ available from Sybase, Inc. of Dublin, Calif.

Among the advances of data warehouse systems in a shared disk cluster is the ability to achieve distributed query processing. Distributed query processing allows SQL queries submitted to one node of the cluster to be processed by multiple cluster nodes, allowing more hardware resources to be utilized to improve performance. Distributed query processing typically requires the nodes to share temporary, intermediate data pertaining to the query in order to process and assemble the final result set, after which the temporary data is discarded. The temporary data consumes space of one or more network storage devices specifically configured for temporary storage use by the database cluster. In a shared disk cluster, the simplest solution for shared temporary storage management is to statically reserve a fixed portion of the shared temporary store for each node in the database cluster. This makes exclusive access rights unambiguous, as each node will use its reserved portion of the shared temporary storage.

However, such fixed portion allocation does not provide intelligent space management, which can adapt to dynamic configuration and workload conditions. Accordingly, a need exists for a flexible and dynamic approach to shared temporary storage management in an SDC. The present invention addresses these and other needs.

BRIEF SUMMARY

Briefly stated, the invention includes system, method, computer program product embodiments and combinations and sub-combinations thereof for temporary storage management in a shared disk database cluster. Included is the reserving of units on-demand and of variable size from shared temporary storage space in the SDC. The utilization of the reserved units of the shared temporary storage space is tracked, and the shared temporary storage space is administered based on the tracking.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for shared temporary storage management in a shared disk database cluster.

Figure 1:
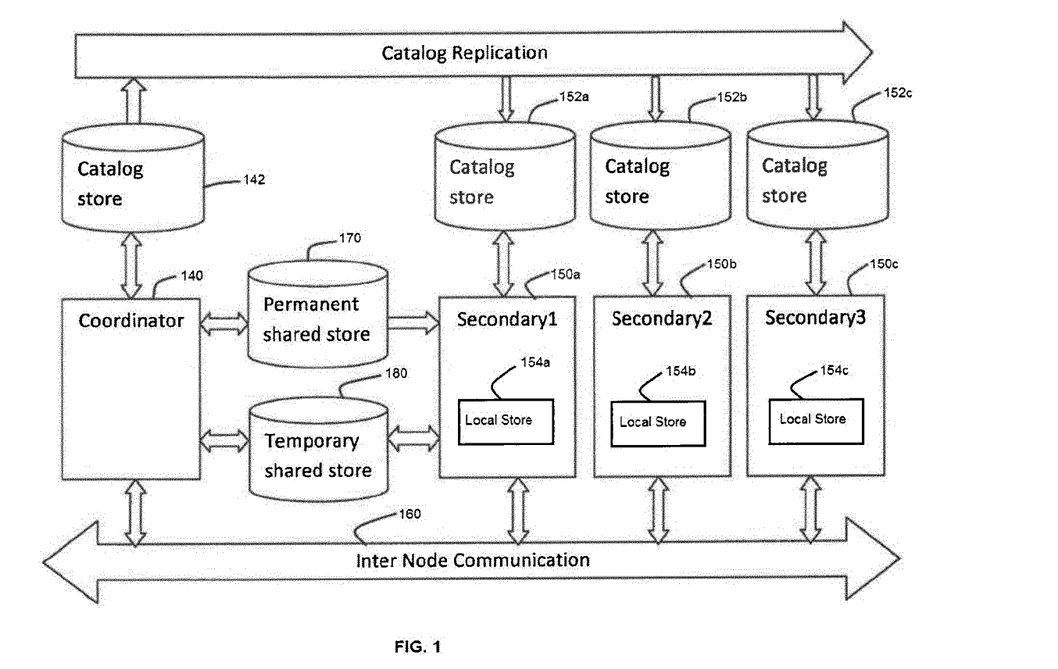
FIG. 1 illustrates an example of a clustered server configuration.

FIG. 1 illustrates an example 100 of a shared disk database cluster, which, in general, handles concurrent data loads and queries from users/applications via independent data processing nodes connected to shared data storage. In operation, shared database objects can be written by one user and queried by multiple users simultaneously. Many objects of this type may exist and be in use at the same time in the database.

Each node is an instance of a database server typically running on its own host computer. A primary node, or coordinator 140, manages all global read-write transactions. Storage data is kept in main or permanent storage 170 which is shared between all nodes, and similarly, temporary data can be shared using shared temporary storage 180. The coordinator 140 further maintains a global catalog, storing information about DDL (data definition language) operations, in catalog store 142 as a master copy for catalog data. Changes in the global catalog are communicated from the coordinator 140 to other nodes 150 via a table version (TLV) log kept inside shared main store 170 through an asynchronous mechanism referred to herein as 'catalog replication'. In catalog replication, the coordinator 140 writes TLV log records which other nodes 150 read and replay to update their local catalog.

Thus, the one or more secondary nodes 150a, 150b, 150c, etc., each have their own catalog stores 152a, 152b, 152c, etc., configured locally to maintain their own local catalogs. The secondary nodes 150 may be designated as reader (read-only) nodes and writer (read-write) nodes, with one secondary node designated as a failover node to assume the coordinator role if the current coordinator 140 is unable to continue. All nodes are connected in a mesh configuration where each node is capable of executing remote procedure calls (RPCs) on other nodes. The nodes that participate in the cluster share messages and data via Inter-node Communication (INC) 160, which provides a TCPIP-based communication link between cluster nodes To handle transactions originating on a node, each node has its own local transaction manager. The transaction manager on the coordinator 140 acts as both local and global transaction manager. Clients may connect to any of the cluster nodes as individual servers, each being capable of running read only transaction on its own using its local transaction manager. For write transactions, secondary nodes 150 can run queries and update inside a write transaction, but only the global transaction manager on the coordinator 140 is allowed to start and finish the transaction (known as global transaction). Secondary nodes 150 internally request the coordinator 140 to begin and commit global transactions on their behalf. Committed changes from write transactions become visible to secondary nodes 150 via catalog replication.

The coordinator node 140 manages separate storage pools for permanent 170 and shared temporary storage 180. All permanent database objects are stored on the shared permanent storage pool 170. The lifespan of permanent objects is potentially infinite, as they persist until explicitly deleted. The state and contents of the shared permanent storage pool 170 must persist across coordinator 140 restarts, crash recovery, and coordinator node failover, as well as support backup and recovery operations.

All nodes also manage their own separate storage pool 154a, 154h, 154c for local temporary data, which consists of one or more local storage devices. Local temporary database objects exist only for the duration of a query. Local temporary database objects are not shared between nodes, and therefore the state and contents of the local temporary storage pool, which are isolated to each single node, do not need to persist across node crashes or restarts.

Distributed query processing typically requires the nodes 140, 150 to share temporary, intermediate data pertaining to the query in order to process and assemble the final result set, after which the temporary data is discarded. Thus, each node in the cluster must have read-write access to a portion of the total shared temporary storage 180 for writing result data to share with other nodes. These portions are logical subsets of the total temporary storage 180 and are physically embodied as stripes across multiple physical disks. In accordance with embodiments of the present invention, the management of shared temporary storage 180 for distributed database queries is achieved in a manner that can adapt to dynamic configuration and workload conditions.

Figure 2:
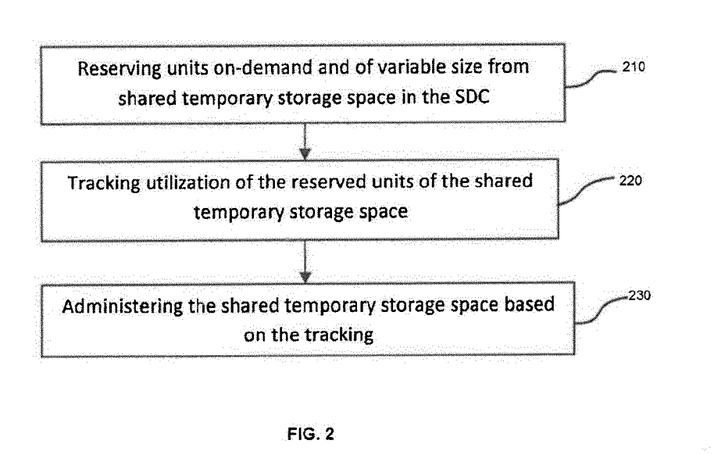
FIG. 2 illustrates a block diagram of an overall approach for shared temporary storage management in accordance with embodiments of the invention.

Referring now to FIG. 2, a block flow diagram illustrates an overall approach in accordance with an embodiment of the invention for temporary storage management to support symmetric distributed query processing in a shared disk database cluster, where any node in the cluster can execute a distributed query. The approach includes reserving units on-demand and of variable size from the shared temporary space in the SDC (block 210), tracking the utilization of reserved units of the shared temporary space (block 220), and administering the shared temporary space based on the tracking (block 230).

In operation, a node 150 requests a shared temporary space reservation when needed from the coordinator 140 via IPC calls. In response, the coordinator 140 provides discrete reservation units and controls the size of the reservation units carved out of the global shared temporary storage pool 180 based on the remaining free space, the number of nodes in the cluster, and the current reservations for the requesting node.

In an embodiment, an initial size of the reserved space is inversely proportional to the number of nodes, to allow all nodes in the SDC to have a fair chance at getting an initial allocation, under an assumption that all nodes in the SDC will eventually require an allocation. A suitable formula representation is: Initial request size=1/(number of nodes)*(initial request reservation percentage), where the 'number of nodes' refers to a total of the number of nodes currently in the SDC, and the 'initial request reservation percentage' refers to the percent of the total shared temporary space to reserve for initial allocations for all nodes. In an embodiment, the percentage is a hard coded value but could easily be replaced with a field-adjustable parameter, if desired.

If the calculated initial request size is greater than a predetermined maximum request size (e.g., a field adjustable database option), the size is rounded down to the maximum. Conversely, if the calculated initial request size is smaller than a minimum request size, it is rounded up to the minimum.

Any subsequent requests by a node follow a different calculation, with the initial request sizing potentially larger than subsequent request sizes, to minimize "ramp up" time to reach a shared temporary storage usage steady state when starting a node. A suitable formula representation for the calculation is:

Subsequent request size=(subsequent request percentage) *(remaining free space−initial reservation pool size). The 'subsequent request percentage' refers to a flat percentage of the remaining space in the shared temporary storage pool (e.g., a hard coded value or a field-adjustable parameter), the 'remaining free space' refers to the total free, unreserved space in the global shared temporary storage pool, and the 'initial reservation pool size' refers to the total space in the global shared temporary storage size multiplied by the initial request reservation percentage ((total storage)*(initial request reservation percentage)). In this manner, the reserved space size gets smaller as less space is available, thus throttling the reservation unit sizes as space runs short, and allows for nodes with a larger shared temporary workload to reserve as much space as needed. Preferably, in order to reduce overhead for small distributed query workloads, all running nodes always retain at least one reservation unit.

In an embodiment, reservation unit chains provide a data structure and methodology used to track the discrete reservation units of space reserved for a particular node. Suitably, the reservation units are added to the chain as a result of the space reservation requests, and removed, such as in a last in, first out (LIFO) manner, via timed expiration of the last link in the chain, with all reservation unit state changes being transactional.

In operation, the coordinator 140 maintains an active reservation unit chain for each node, including the coordinator node, with each active reservation unit marked with the transaction ID of the reservation unit creation, and each active reservation unit chain marked with a timestamp of the last space reservation request for that node. Similarly, an expired reservation unit chain is maintained for each node, with each expired reservation unit marked with the transaction ID at the time of the expiration event. The tracking of all expired reservation units for the SDC in the coordinator 140 achieve transactional persistence of this management data, as is well appreciated by those skilled in the art.

On secondary nodes 150, an active reservation unit chain is maintained representing the reservation units received by only that node. Each active reservation unit is marked with the transaction ID of the reservation unit creation and with a timestamp of the last space reservation request for that node. An expired reservation unit chain also is maintained representing the reservation units expired by only that node.

The reservation units received by a node provide free space for allocation of shared temporary data. The tracking of the allocation of free space to an object by a node occurs via a bitmap referred to herein as a freelist. Thus, when a node allocates disk space for an object, it updates its freelist to set the blocks for that object in use, and when a node de-allocates disk space for an object, it updates the freelist to set the blocks for that object free. In an embodiment, each bit in the freelist represents a logical disk block, which is part of the logical storage space consisting of all the physical disk blocks of the network storage devices configured for that storage pool, where a bit value of 0 means that the logical block is free, while a bit value of 1 means that the logical block is in use.

The coordinator node 140 owns a global shared temp freelist for tracking which blocks are globally free, meaning they are free to be reserved for exclusive use by the SDC nodes. Being the owner of the global shared temp freelist, the coordinator 140 has to maintain the global shared temp freelist block space in synchronization with changes to the shared temp store space (adding and removing files, RO/RW state, etc.), persist the global shared temp freelist state on coordinator 140 shutdown and failover, perform crash recovery of the global shared temp freelist state in the event of coordinator 140 crash, manage freelist space reservations for all nodes, including itself, return freelist space reservations to the global shared temp freelist once they are released by a node, and return space for shared temporary data logically freed by one node back to the node the space is reserved for.

No node, including the coordinator 140, can allocate space for temporary objects directly from the global shared temp freelist; instead, each node must first reserve space for exclusive use and allocate blocks from that reserved space. Accordingly, the coordinator 140 maintains two shared temp freelists, the global shared temp freelist and a proxy shared temp freelist (tracking reserved space usage for the coordinator 140).

Each secondary node 150 also maintains its own shared temp proxy freelist, which tracks reserved space usage for that node. The initial shared temp proxy freelist on secondary nodes is empty, meaning it contains no free space. Further, as secondary node proxy freelist contents are not expected to persist across secondary server 150 restarts, every time a node is restarted, (e.g., the initial startup, or a startup after clean shut down or crash), the shared temp proxy freelist returns to a "no space available" state. When a node receives a reservation unit in response to a space reservation request, it sets bit positions in its shared temp proxy freelist to 0 (i.e., "free", allowing shared temporary data allocations to use that free space) for each bit with a 1 value (reserved) in the reservation unit. In an embodiment, reservation units are bitmaps which set bit positions corresponding to logical disk blocks represented in the global shared temp freelist to be reserved for a particular node. All blocks in the shared temp freelist not freed via space reservation are essentially masked; the secondary node proxy freelist has them marked in use.

Depending on the usage of the object which was allocated, the object may be logically destroyed by the node which allocated it or it may be logically destroyed by another node participating in the distributed query. When a shared temporary object is logically destroyed, the space allocated for that object must be returned to the proxy freelist of the node which allocated it. This is done via a global shared temp garbage collection mechanism, which recycles all non-locally freed shared temp space to the respective owner through the coordinator 140.

The garbage collection logic handles processing of the global free bitmaps maintained by each node. In an embodiment, each node maintains one global free bitmap, which is a bitmap representing logical storage blocks to be sent to the coordinator 140 for return either to the node for which the block is reserved or returned to the global shared temporary storage pool if the block is no longer reserved for any node. Secondary nodes 150 send the contents of their global free bitmap to the coordinator node 140 periodically via IPC during the database garbage collection event. The result of a secondary node garbage collection event is to transfer the logical storage blocks from that node's global free bitmap to the coordinator node's global free bitmap. The coordinator node's garbage collection event then periodically processes its global free bitmap and returns de-allocated blocks to the node for which the blocks are still reserved or to the global pool if the blocks are no longer reserved. Thus, shared temporary storage is recycled to the proper owner after de-allocation by any node.

Reservation unit chain expiration allows for the returning of unused shared temp space currently reserved for a node back to the global storage pool, such as when nodes temporarily hold more reservation units than usual to accommodate a busy period. Reservation unit chain expiration uses the following logic.

Each node, including the coordinator node, controls its own reservation unit expiration, driven periodically by a timed database event and based on the local timestamp and an expiration period of each active reservation unit chain. The expiration period is a value expressing the amount of time the current reservation unit chain is valid, and the reservation unit chain timestamp is reset every time a new reservation unit is added to the chain via a successful reservation unit request to the coordinator. At each garbage collection event, the current reservation unit chain is considered expired when the amount of time past the timestamp exceeds the expiration period.

When a reservation unit chain expires, the last reservation unit in the chain is removed, essentially shortening the chain in a LIFO manner, and the active reservation unit chain timestamp is reset. On all nodes, expiring reservation unit bitmaps are compared against the shared temp proxy freelist, and all bits in the expiring reservation unit which are currently marked 0 (free) in the shared temp proxy freelist will be marked 1 (to be returned to the global pool) in the global free bitmap, and marked 1 (in use) in the shared temp proxy freelist.

Any shared temp blocks which were currently in use by the node (marked 1 in the shared temp proxy freelist) during the expiration will not be transferred to the global free bitmap immediately. When these blocks are eventually de-allocated they will not be marked free in the proxy freelist but instead transferred to the global free bitmap. This decision is made during the de-allocation process by checking whether the bit position of the block being de-allocated is accounted for in the active or the expired reservation unit chain. The end result of de-allocating an "expired" shared temp block is that the corresponding bit position in the global free bitmap set to 1 (to be globally freed) and the corresponding bit position in the expired reservation unit set to 0 (no longer accounted for as expired).

In the first stage of the garbage collection cycle, the secondary nodes 150 communicate reservation unit expiration and the global free bitmap to the coordinator 140 via an IPC call as part of the periodic garbage collection event. This IPC call sends the unique IDs of each expired reservation unit. The secondary node 150 keeps the expired reservation unit in its local reservation unit chain until it receives a positive acknowledgement from the coordinator 140 that the coordinator 140 has processed the expiration. This is considered necessary to eliminate race conditions and failure scenarios where a given storage block would be left unaccounted for. Expired reservation unit chains for all nodes are maintained persistently across coordinator 140 restart and failover, and reservation unit expiration for the coordinator 140 is directly processed by the coordinator 140 during its periodic garbage collection event.

The coordinator 140 performs comparisons as part of the garbage collection event (e.g., using bitwise logical AND comparisons). One comparison involves comparing the global free bitmap against the bitmaps in the active reservation unit chains for all secondary nodes and producing a single return blocks bitmap, which records all the blocks to be returned to all secondary nodes. The global free bitmap is also compared against the bitmaps in the active reservation unit chain for the coordinator. The result of that comparison is used to mark blocks free in the coordinator's shared temp proxy freelist, meaning they are free for the coordinator to allocate. Additionally, the global free bitmap is compared against the bitmaps in the expired reservation unit chains for all nodes, and the result is used to mark blocks free in the global shared temp freelist, meaning they are free for reservation by specific nodes.

At the end of each garbage collection event, the coordinator 140 writes the return blocks bitmap to the shared permanent store, and adds a record to a global version synchronization log. This shared log structure on the shared permanent store is used to propagate metadata changes from the coordinator 140 to all secondary nodes 150, such as is capable in the environment of the aforementioned Sybase IQ. When secondary nodes 150 detect a new return blocks entry in the global version synchronization log, each secondary node 150 compares the return blocks bitmap against their active and expired reservation units. Any blocks matching with active reservation units are freed in the node's shared temp proxy freelist. Any blocks within the node's expired reservation units are added to the global free bitmap for return to the coordinator 140, and removed from that node's local expired allocation units. Any blocks outside of these conditions are ignored.

Figure 3A:
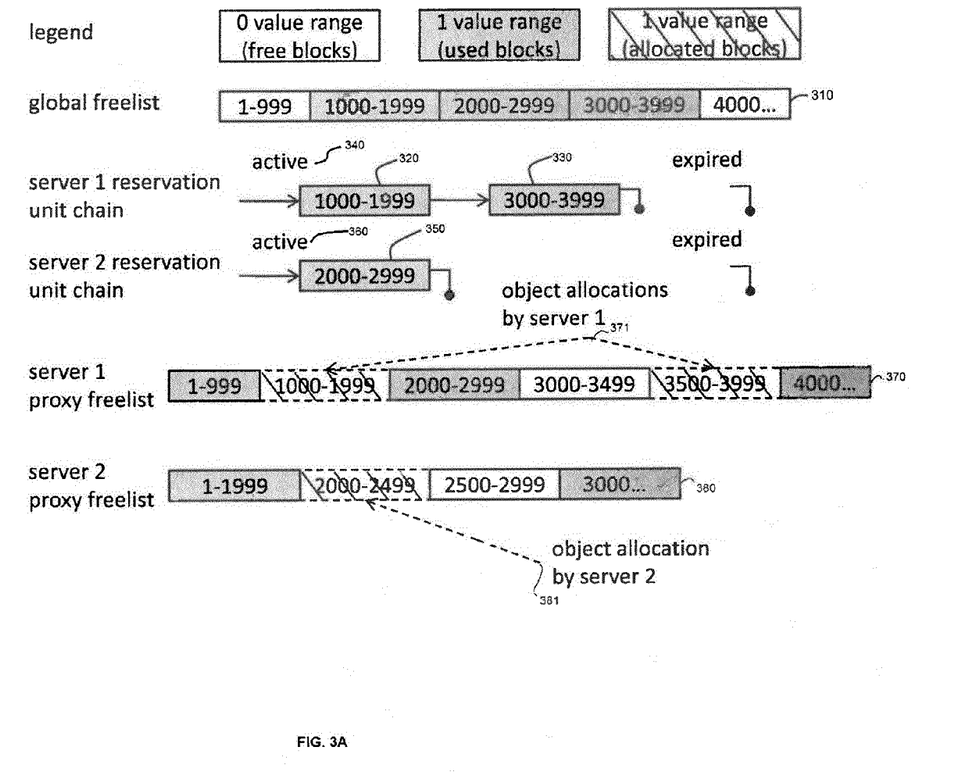
FIGS. 3a, 3b, 3c, 3d, and 3e illustrate block diagram representations of an example of shared temporary storage states in accordance with embodiments of the invention.

Referring now to FIGS. 3a, 3b, 3c, 3d, and 3e, block diagram representations of an example of shared temporary storage states in accordance with embodiments of the invention are illustrated. The example refers to a cluster configuration having three nodes, namely, a coordinator, a server 1 and a server 2. As shown in FIG. 3a, a global freelist 310 has three sets of blocks marked as used, corresponding to reservation units 320 and 330 reserved in response to separate requests by server 1 and included in its active reservation unit chain 340, and reservation unit 350 reserved in response to a request by server 2 and included in its active reservation unit chain 360. Object allocations 371 of blocks 1000-1999 and 3500-3999 of server 1 are reflected as such in the server 1 proxy freelist 370, while the proxy freelist 380 of server 2 reflects the object allocation 381 of server 2 in blocks 2000-2499.

Figure 3B:
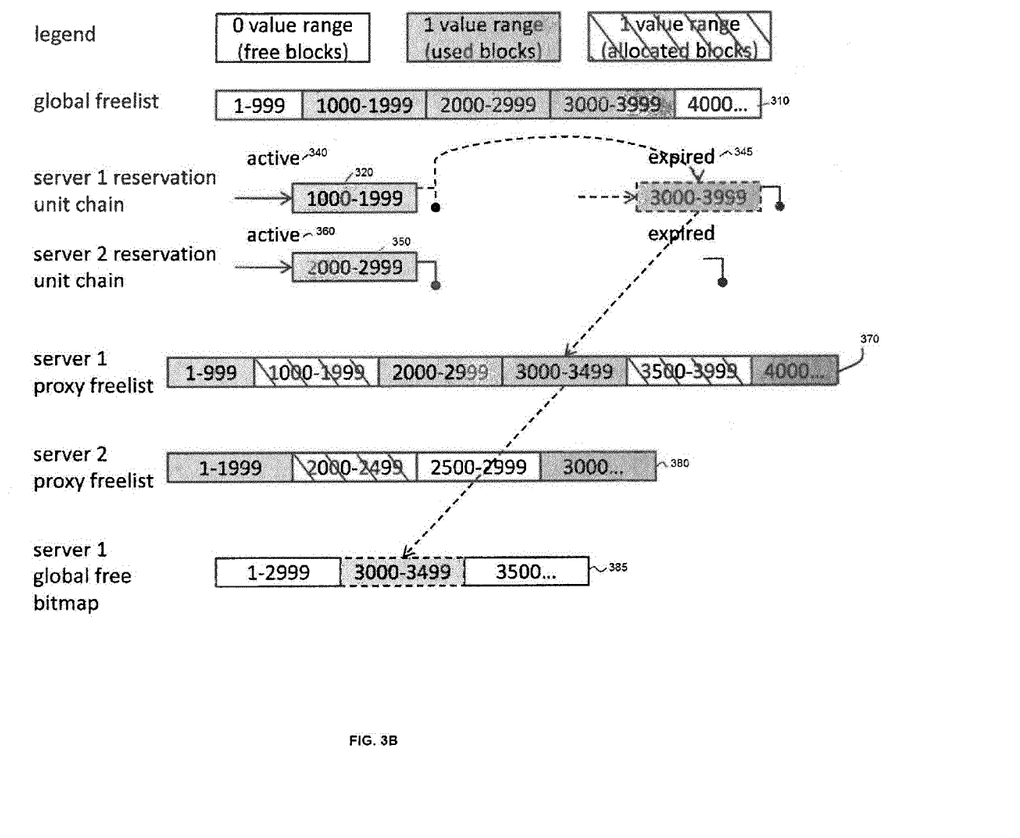
Figure 3C:
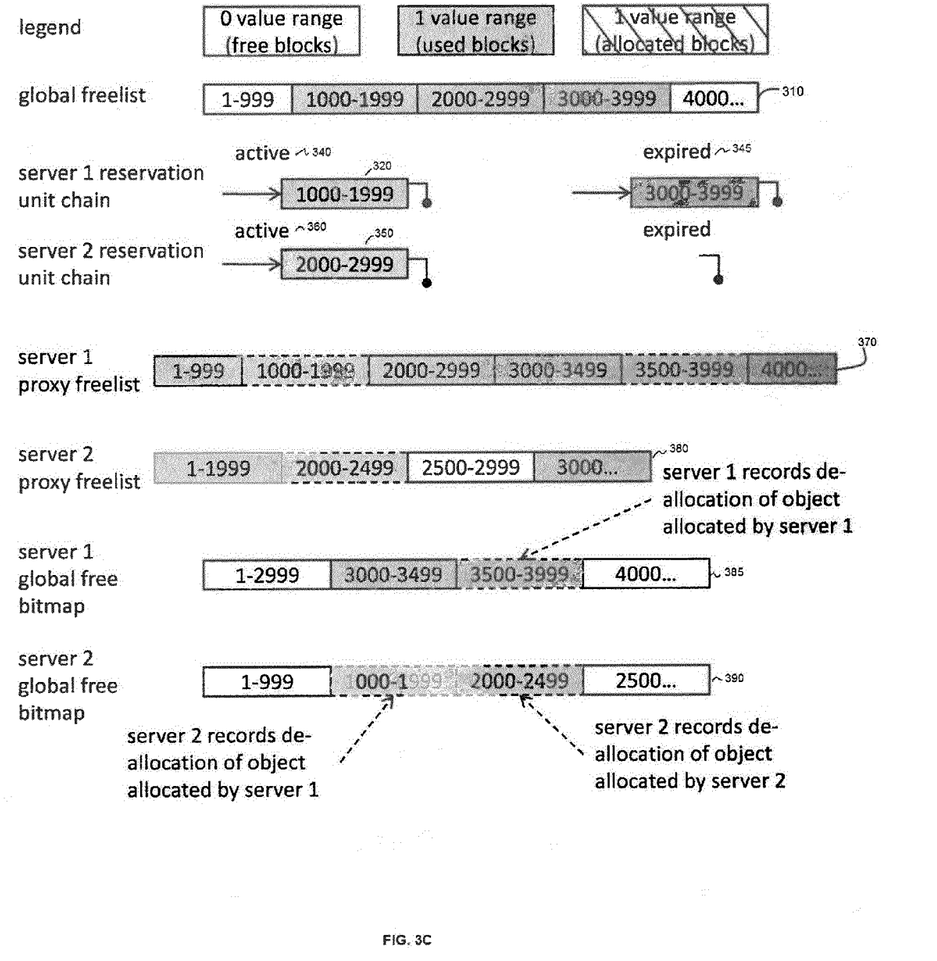

At some time later, change occurs, including server 1 expiring its second reservation unit and recording de-allocation of unused storage on that unit, with the bitmap 385 updated, as represented in FIG. 3b. As represented in FIG. 3c, the global free bitmap 385 of server 1 records the deallocation of objects allocated by server 1, while the global free bitmap 390 of server 2 records the deallocations by server 2, which includes objects originally allocated by server 1 and server 2.

Figure 3D:
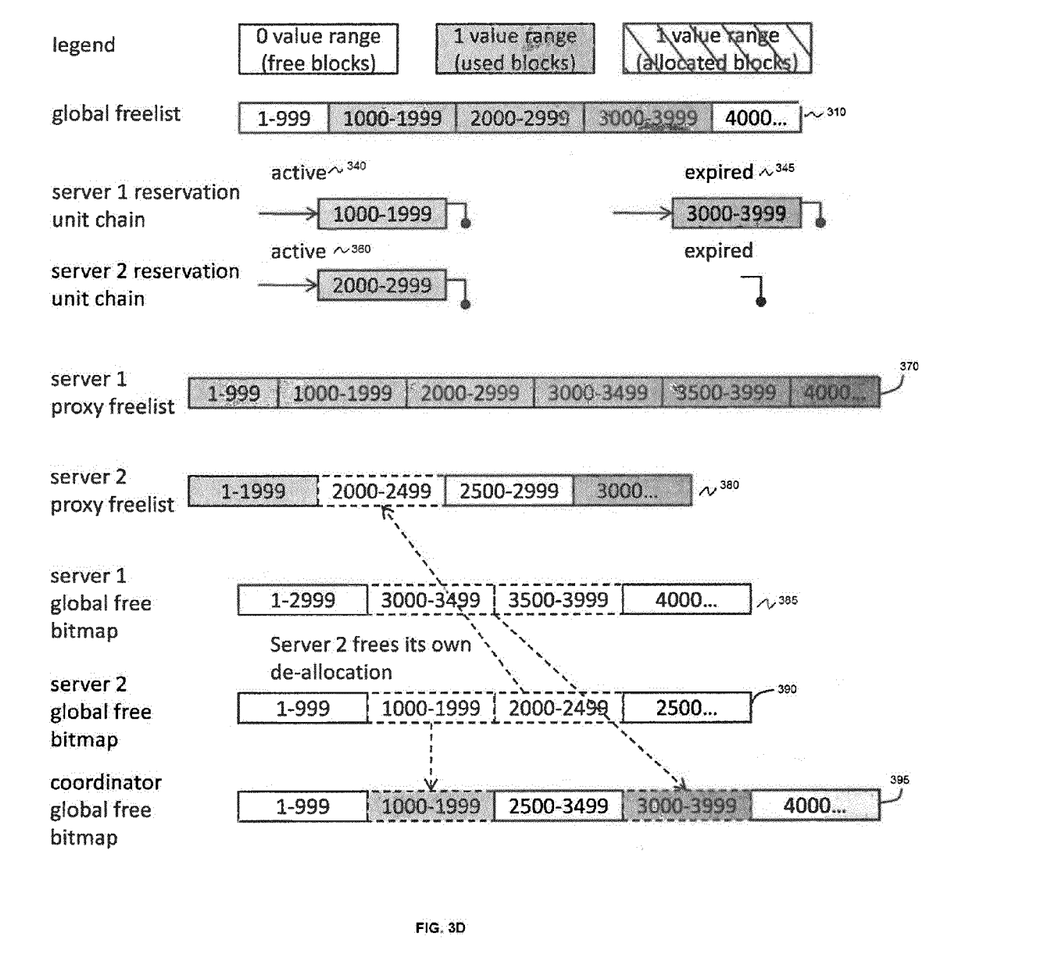
Figure 3E:
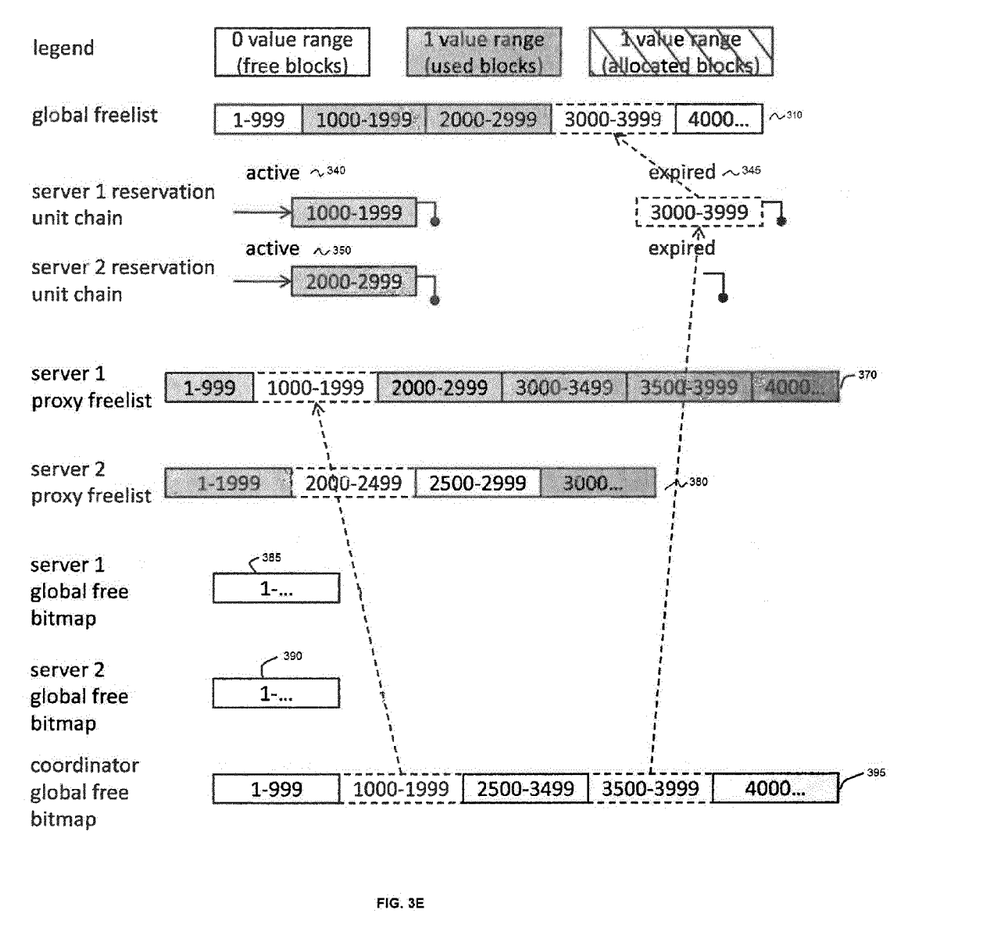

For a garbage collection event on the secondary nodes, the blocks freed by server 1 and server 2 are removed from the global free bitmaps 385 and 390, respectively, and the secondary servers transfer the global free blocks to coordinator global free bitmap 395 of the coordinator, as represented in FIG. 3d. Also, the server 2 proxy freelist is updated to free blocks owned by server 2. As represented in FIG. 3e, for the garbage collection event on the coordinator, the server 1 deallocation is recorded in the return blocks bitmap, which is written to the version synchronization log. When server 1 processes the log, server 1 frees these blocks in its proxy freelist. The coordinator further clears the expired allocation 345 and global storage in the global shared temp freelist 310 for blocks formerly allocated by server 1.

In accordance with the embodiments of the invention, the shared temporary storage management system capably reserves shared temporary store portions for nodes on-demand, rather than statically. This allows for intelligent space management that can adapt to dynamic configuration and workload conditions. Further, the space used for temporary objects is always eventually freed, so that under a steady workload, a minimum steady-state space reservation per node can be maintained. Also, any given node may reserve multiple portions of the shared temporary storage to accommodate a temporary peak in distributed query processing workload, and then return the portion(s) to the global storage pool after the workload peak subsides. This allows for more economical storage configurations, such as in situations where peak workloads typically occur on a subset of nodes at any given time, rather than all nodes simultaneously. In addition, through the throttling of portion sizes as resources in the shared temporary storage pool are consumed due to increased workload in the database cluster, space efficiency is increased, and unnecessary global starvation of the temporary storage space is prevented during peak workloads.

Figure 4:
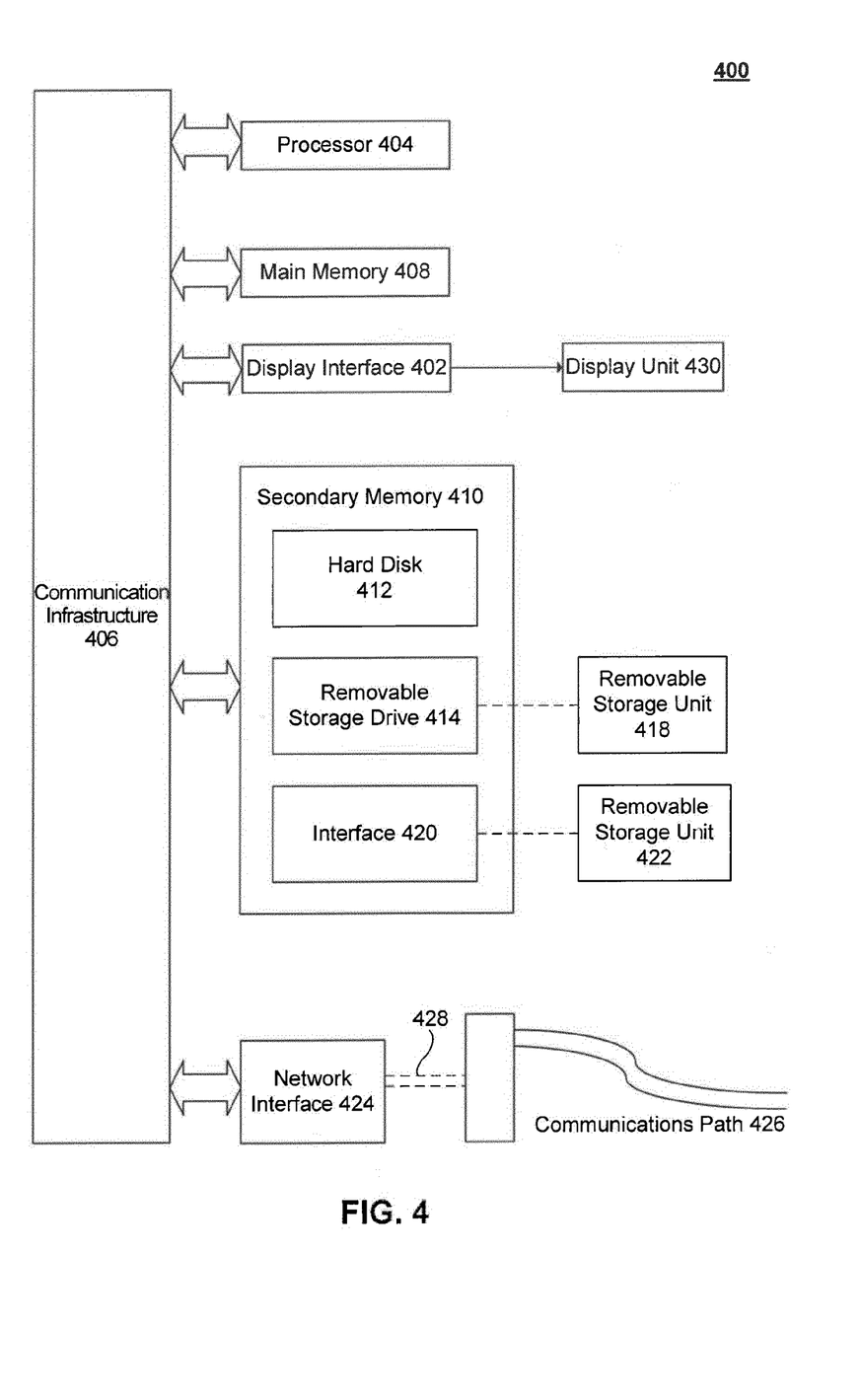
FIG. 4 illustrates an example computer useful for implementing components of embodiments of the invention.

Various aspects of the present invention can be implemented by software, firmware, hardware, or a combination thereof. FIG. 4 illustrates an example computer system 400, such as capable of acting as the nodes in the cluster of FIG. 1, in which the present invention, or portions thereof, can be implemented as computer-readable code. For example, the methods illustrated by flowchart of FIG. 2 can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the method illustrated by the flowchart of FIG. 2. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for shared temporary storage management in a shared disk database cluster (SDC), the method comprising:
    reserving units on-demand and of variable size from shared temporary storage space in the SDC, wherein the reserving controls a size of the reserved units based upon configuration of the SDC, remaining space of the shared temporary storage space, and a number of configured nodes, and wherein the shared temporary storage space exists independent from the reserving units;
    tracking utilization of the reserved units of the shared temporary storage space, wherein coordinator and secondary nodes of the SDC maintain bitmaps which track the utilization of the reserved units, and each bit in the bitmaps represents a logical disk block and tracks whether the logical disk block is free or in use, and wherein the secondary nodes periodically send content of the bitmaps associated with the secondary nodes to the coordinator node; and
    administering the shared temporary storage space based on the tracking.

2. The method of claim 1 wherein tracking further comprises updating the bitmaps with respect to space allocation activity for chains of reserved units.

3. The method of claim 1 wherein tracking further comprises updating the bitmaps with respect to timed expiration periods.

4. The method of claim 3, wherein the expiration period is reset when a new reservation unit is added to the bitmap.

5. The method of claim 1 wherein administering further comprises utilizing a garbage collection event.

6. The method of claim 5 wherein the garbage collection event handles expired reserved units and deallocated temporary storage space for reuse in the SDC.

7. A shared disk database cluster (SDC) system with temporary storage management comprising:
    shared-disk storage; and
    a plurality of data processing nodes reserving units on-demand and of variable size from shared temporary storage space of the shared-disk storage, wherein the data processing nodes reserving units controls a size of the reserved units based upon configuration of the SDC, remaining space of the shared temporary storage space, and a number of configured nodes, and wherein the shared temporary storage space exists independent from the reserving units, and administering the shared temporary storage space through tracked utilization of the reserved units, wherein coordinator and secondary nodes of the SDC maintain bitmaps which track the utilization of the reserved units, and each bit in the bitmaps represents a logical disk block and tracks whether the logical disk block is free or in use, and wherein the secondary$_{13}$ nodes periodically send content of the bitmaps associated with the secondary nodes to the coordinator node.

8. The system of claim 7 wherein the updates to bitmaps include space allocation activity for chains of reserved units.

9. The system of claim 7 wherein the updates to the bitmaps include timed expiration periods.

10. The system of claim 7 wherein administering further comprises utilizing a garbage collection event.

11. The system of claim 10 wherein the garbage collection event handles expired reserved units and deallocated temporary storage space for reuse in the SDC.

12. A non-transitory computer-usable medium having instructions recorded thereon that, if executed by a computing device, cause the computing device to perform a method comprising:
    reserving units on-demand and of variable size from shared temporary storage space in a shared disk cluster (SDC), wherein the reserving controls a size of the reserved units based upon configuration of the SDC, remaining space of the shared temporary storage space, and a number of configured nodes, and wherein the shared temporary storage space exists independent from the reserving units;
    tracking utilization of the reserved units of the shared temporary storage space, wherein coordinator and secondary nodes of the SDC maintain bitmaps which track the utilization of the reserved units, and each bit in the bitmaps represents a logical disk block and tracks whether the logical disk block is free or in use, and wherein the secondary nodes periodically send content of the bitmaps associated with the secondary nodes to the coordinator node; and
    administering the shared temporary storage space based on the tracking.

13. The computer-usable medium of claim 12 wherein tracking further comprises updating the bitmaps with respect to space allocation activity for chains of reserved units.

14. The computer-usable medium of claim 12 wherein tracking further comprises updating the bitmaps with respect to timed expiration periods.

15. The computer-usable medium of claim 12 wherein administering further comprises utilizing a garbage collection event to handle expired reserved units and deallocated temporary storage space for reuse in the SDC.

16. A method comprising: receiving an initial request, from a first node of a plurality of nodes in a shared disk database cluster (SDC) of nodes performing distributed processing of a query in the SDC, to reserve a portion of a shared temporary storage space, that exists independent from the plurality of nodes, wherein each of the plurality of nodes is allocated at least a portion of the shared temporary storage space; determining whether the initial request is less than a max request size; and providing a first discrete reservation unit to the first node based on the initial request, wherein the discrete reservation unit is of a size that is the lesser of the initial request of the max request size, wherein a second node in the cluster is allocated a second discrete reservation unit of a size different than the size of the first discrete reservation unit.

17. The method of claim 16, wherein the initial request is a request for a percentage of the portion of the shared temporary space allocated to the first node.

18. The method of claim 17, further comprising:
    receiving a subsequent request from the first node, wherein the subsequent request is for a percentage of remaining free space in the shared temporary space; and
    providing a subsequent discrete reservation unit to the first node, wherein a size of the subsequent discrete reservation unit is determined based on the remaining free space, the number of nodes in the cluster, and any current reservation units provided to the first node.

* * * * *